(No Model.)

L. MAICHE.
APPARATUS FOR HEATING OR COOLING FLUIDS BY FLUIDS.

No. 596,330. Patented Dec. 28, 1897.

Witnesses
Inventor
Louis Maiche
by James L. Norris
attorney

United States Patent Office.

LOUIS MAICHE, OF PARIS, FRANCE.

APPARATUS FOR HEATING OR COOLING FLUIDS BY FLUIDS.

SPECIFICATION forming part of Letters Patent No. 596,330, dated December 28, 1897.

Application filed April 26, 1897. Serial No. 634,005. (No model.)

*To all whom it may concern:*

Be it known that I, LOUIS MAICHE, a citizen of France, residing at 368 Rue St. Honoré, Paris, France, have invented certain new and useful Improvements in Apparatus for Heating or Cooling Fluids by Fluids, of which the following is a specification.

Many apparatus for heating or cooling a fluid by another fluid consist of conduits through which the one fluid flows, while the other flows usually in the opposite direction in contact with the surfaces of these conduits.

My invention relates to means of rendering such apparatus more effective in heating or cooling by arrangements which cause a more rapid transmission of heat through the metal which separates the conduit for the one fluid from that for the other. For this purpose I fill up either conduit or both with a number of small tubes or conduits of good conducting metal, such as copper, in close contact with one another and with the sides of the conduit. The heating or cooling fluid or the fluid to be heated or cooled flowing through these tubes or conduits and also through the interstices between them is thus subdivided into a number of small streams, which having intimate connection through conducting metal with the wall which separates the one fluid from the other imparts heat to that wall or receives heat from it more readily than when the stream of fluid is not so subdivided, for when there is no such subdivision the only active and reactive portions of the fluid are those which are next the wall of separation.

Figure 1:
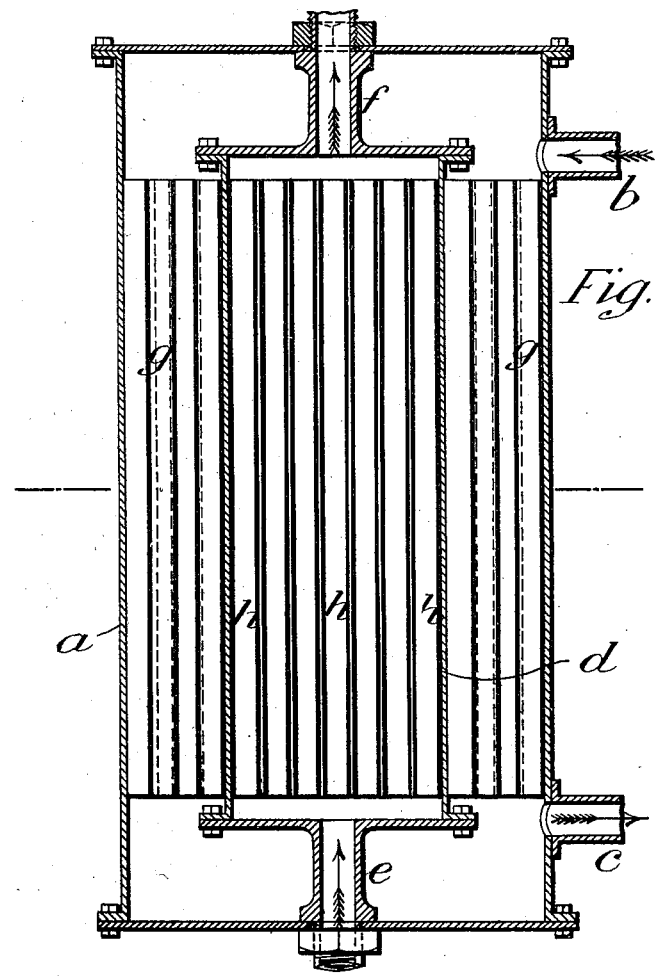
Figure 2:
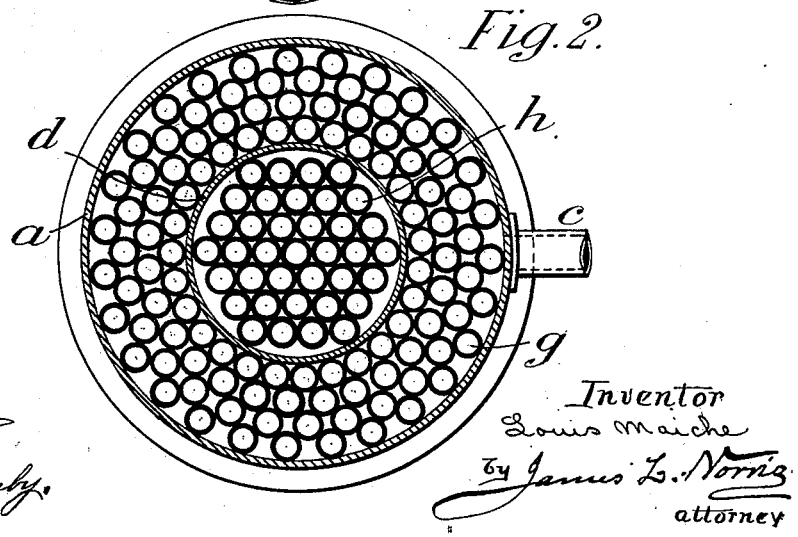

Figure 1 of the accompanying drawings is a vertical section, and Fig. 2 is a sectional plan, of a fluid heating or cooling apparatus, illustrating my invention by way of example.

It comprises an outer cylindrical casing $a$, having an inlet $b$ and an outlet $c$, and an inner cylindrical casing $d$ with inlet $e$ and outlet $f$. The whole of the cylinder $d$ is filled up with small tubes or conduits $h$ of good conducting metal, such as copper, packed close together and touching the wall of the cylinder $d$ at as many points as possible. In like manner the whole annular space between $a$ and $d$ is packed with tubes or conduits $g$. A heated fluid, such as hot water or steam, being supplied to the inlet $b$ it will descend through the tubes or conduits $g$ and the interstices between them, heating them and becoming itself cooled and will issue by the outlet $c$. Another cold fluid, it may be water, for instance, or air, being supplied to the inlet $e$ will ascend through the tubes or conduits $h$ and the interstices between them, cooling them and becoming itself heated and will issue by the outlet $f$. Obviously the fluid movements indicated by the arrows may be inverted, cold fluid entering at $c$ and issuing at $b$, while hot fluid enters at $f$ and issues at $e$. By similar arrangements the efficiency of a water-tube boiler can be largely increased by crowding small tubes into the main tubes, and the efficiency of a tubular or flue boiler may also be increased by crowding with small tubes the space surrounding the tubes or flues. When boilers are treated in this manner, distilled water should be used, so as to avoid deposit in the small tubes and their interstices.

Having thus described the nature of this invention and the best means I know for carrying the same into practical effect, I claim—

In apparatus for heating or cooling fluids the combination with conduits arranged in operative relation and through which the fluids at differing temperatures are to be passed, of a number of small conduits of good conducting metal clustered closely together in the said conduits and bearing against the walls thereof, substantially as and for the purpose set forth.

In testimony whereof I have signed my name to this specification, in the presence of two subscribing witnesses, this 8th day of April, A. D. 1897.

LOUIS MAICHE.

Witnesses:
CHAS. S. HOPKINS,
G. F. WARREN.